UNITED STATES PATENT OFFICE.

HENRY VOGLEY, OF ELYRIA, OHIO, ASSIGNOR TO CHARLES F. SMITH, OF SAME PLACE.

COMPOSITION FOR CEMENTING RUBBER.

SPECIFICATION forming part of Letters Patent No. 368,174, dated August 9, 1887.

Application filed December 31, 1886. Serial No. 223,129. (No specimens.)

*To all whom it may concern:*

Be it known that I, HENRY VOGLEY, a citizen of the United States, residing at Elyria, in the county of Lorain and State of Ohio, have invented a new and useful composition of matter to be used in the cementing together of rubber and rubber goods consisting in whole or in part of rubber, of which the following is a specification.

My composition consists of a combination of rubber, gum of gamboge, white lead, and benzine with sulphur and sulphuric ether, to which may be added alum and burnt brown sugar. These ingredients may be united in varying quantities to a certain extent and still produce good results. To obtain the best results and prepare my cement in the best proportions, first take pure rubber gum cut fine, two and one-half ounces; pulverized gum-gamboge, three ounces; dry white lead, eleven ounces; best benzine, one gallon. Mix and agitate the above ingredients thoroughly and then let same stand in a closed vessel until the gums are completely dissolved. They should stand at least from twenty-four to forty-eight hours. Second, take pulverized sulphur, two ounces; sulphuric ether, two and one-half ounces; pulverized alum, one-half ounce; burnt brown sugar, one-fourth pound. Mix thoroughly and let stand at least twelve hours in a close vessel. Then thoroughly mix the two parts together and let stand and settle for twenty-four hours before using.

The burnt sugar is not a necessary ingredient, but it is used to give additional body to the cement. Neither is the alum absolutely essential, but is added to help cut and clarify the mixture. When this cement becomes too thick for use by standing or evaporation, it can be thinned by adding a sufficient quantity of best quality of benzine.

In using this mixture the parts to be cemented are to be rasped with a file and each part covered with a thin coating of the cement and then let stand at least fifteen to thirty minutes, when they are joined and pressed together firmly, and may be lightly hammered.

By use of the above composition a durable, tenacious, and effective cement is formed for all grades of rubber goods.

What I claim, and desire to secure by Letters Patent of the United States, is—

A cement for rubber goods, consisting of a combination of gum-rubber, gum-gamboge, white lead, benzine, sulphur, and sulphuric ether, as above described, and in the proportions specified, all as above set forth.

HENRY VOGLEY.

Witnesses:
 ALLIE E. BRUCE,
 E. C. MANTER.